United States Patent
Scott et al.

[11] Patent Number: 5,941,601
[45] Date of Patent: Aug. 24, 1999

[54] CHILD SEAT ANCHORAGE

[75] Inventors: Tim Scott, Benfleet; John E Gregar, Wickford, both of United Kingdom

[73] Assignee: Ford Motor Company, Dearborn, Mich.

[21] Appl. No.: 09/152,203

[22] Filed: Sep. 11, 1998

[30] Foreign Application Priority Data

Sep. 11, 1997 [GB] United Kingdom ............. 97192801

[51] Int. Cl.⁶ ................................................. B60N 2/28
[52] U.S. Cl. .................................. 297/253; 297/250.1
[58] Field of Search ........................ 297/216.11, 250.1, 297/253, 256.16

[56] References Cited

U.S. PATENT DOCUMENTS

| | | | |
|---|---|---|---|
| 5,383,708 | 1/1995 | Nagasaka et al. | 297/250.1 |
| 5,466,044 | 11/1995 | Barley et al. | 297/250.1 X |
| 5,487,588 | 1/1996 | Burleigh et al. | 297/250.1 X |
| 5,536,066 | 7/1996 | Sedach | 297/250.1 |
| 5,816,651 | 10/1998 | Feuerherdt | 297/253 |

*Primary Examiner*—Peter R. Brown
*Attorney, Agent, or Firm*—Steven A. Maynard

[57] ABSTRACT

A motor vehicle passenger seat includes a seat, a seat-back in contacting relationship with the seat, and a pair of laterally spaced anchorage members for anchoring a child seat disposed at the point of contact between the seat and seat-back, the anchorage members are pivotally mounted in relation to the seat whereby the anchorage members can be pivoted between a use position in which they are upwardly disposed through a gap between the seat and the seat-back so that a child seat can be secured thereto, and a stowage position in which the anchorage members are downwardly disposed through the gap and hidden from view thereby, the anchorage members being constrained to pivot in opposite directions to one another when moving between the use and stowage positions.

11 Claims, 3 Drawing Sheets

CHILD SEAT ANCHORAGE

FIELD OF THE INVENTION

The present invention relates to motor vehicles having passenger seats provided with a child seat anchoring mechanism and, more specifically, to a device for use in anchoring a child seat to such passenger seats.

BACKGROUND OF THE INVENTION

Some vehicle child seats are secured in a vehicle passenger seat by a pair of clips or latches on the child seat that are releasably mounted on a pair of rigid anchorage points in the vehicle. The anchorage points are typically located in the passenger seat at the intersection of the seat and seat-back. Conventional linkages between the clips or latches on the child seat and the anchorage points on the passenger seat are sufficiently rigid to secure a child seat to the passenger seat without the need for any other securing mechanism.

Problematically, the rigid anchorage points makes folding of the seat difficult, because the anchorages prevent the seat-back from being fully lowered. The anchorage points may also be uncomfortable for a passenger sitting in the seat when the child seat is not mounted on the seat. Furthermore, the clips on the child seat are liable to damage the fabric of the seat-back or to damage an adjacent socket for a seat belt buckle, if accidentally pushed into the socket.

What is desired than are a pair of anchorage members for anchoring a child safety seat that do not interfere with seat-back folding, that do not negatively impact passenger comfort and that do not damage the seat-back material or an adjacent socket for a seat belt buckle, if inadvertently pushed into the socket.

SUMMARY OF THE INVENTION

The present invention overcomes the disadvantages of the related art by providing a motor vehicle passenger seat including a seat, a seat-back in contacting relationship with the seat, and a pair of laterally spaced anchorage members for anchoring a child seat disposed at the point of contact between the seat and seat-back. The anchorage members are pivotally mounted in relation to the seat whereby the anchorage members can be pivoted between a use position in which they are upwardly disposed through a gap between the seat and the seat-back so that a child seat can be secured thereto, and a stowage position in which the anchorage members are downwardly disposed through the gap and hidden from view thereby, the anchorage members being constrained to pivot in opposite directions to one another when moving between the use and stowage positions.

Advantageously, because the anchorage members are pivotable, they can be stowed behind the seat when not required. The seat-back can, therefore, be tilted fully forward when the anchorage members are in the stowage position, and passengers not requiring a child seat are not discomforted by upwardly projecting anchorage members.

According to a feature of the present invention the anchorage members are constrained to pivot in opposite directions to one another when moving from the use position to the stowage position. At least one anchorage member, therefore, will resist sideways loading applied to the child seat in the event of a side impact.

According to a preferred embodiment of the present invention, the anchorage members are connected together as a child seat anchoring device by spacing means. Any suitable spacing means may be used, for example a rigid bar or a pair of bars which are telescopically adjustable so that the distance between the anchorage members can be varied by the user to accommodate different designs of child seat. Such child seat anchoring devices may be manufactured and sold separately from a motor vehicle.

BRIEF DESCRIPTION OF THE DRAWINGS

Other features and advantages of the present invention will become apparent to those skilled in the related arts upon reading the following description with reference to the accompanying drawings, in which.

DETAILED DESCRIPTION OF THE PREFERRED EMBODIMENT

Figure 1:
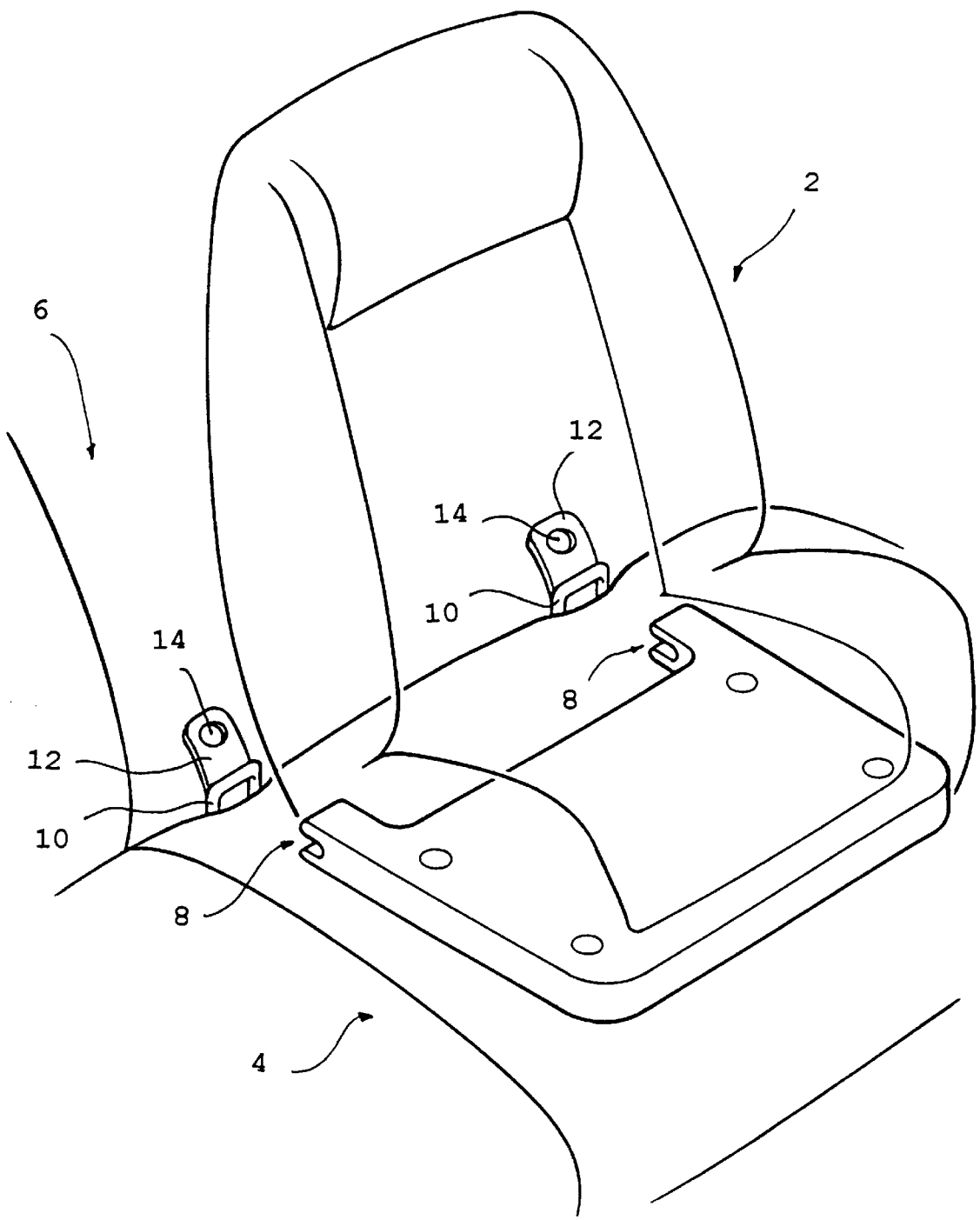
FIG. 1 is a perspective view of a child seat mounted on a vehicle seat provided with an anchoring device in accordance with the present invention.

As shown in FIG. 1, a child seat 2 is provided with a pair of jaws 8 for securing to anchorage members 10 in a vehicle seat, by means of a known latch or clip mechanism (not shown). The anchorage members 10 of the present invention are shown in an upright use position, disposed in the contact point between the seat 4 and seat-back 6 of the vehicle seat, and project through a gap therebetween. To secure the child seat 2, it is pushed back in the vehicle seat until the latch or clip mechanisms engage with the corresponding anchorage members 10.

As shown in FIGS. 1–4, a guard plate 12, formed from a 1 mm thick sheet of plastic material, is disposed between the anchorage member 10 and the seat-back 6. The guard plate 12 protects the seat-back from the latch or clip mechanism, or the jaws 8, of the child seat 2. The guard plate 12 is provided with a finger hole 14 to facilitate lifting of the anchorage member 10 from a stowage position to the use position shown in FIG. 1. The guard plate 12 follows the contour of the seat-back 6.

Figure 2:
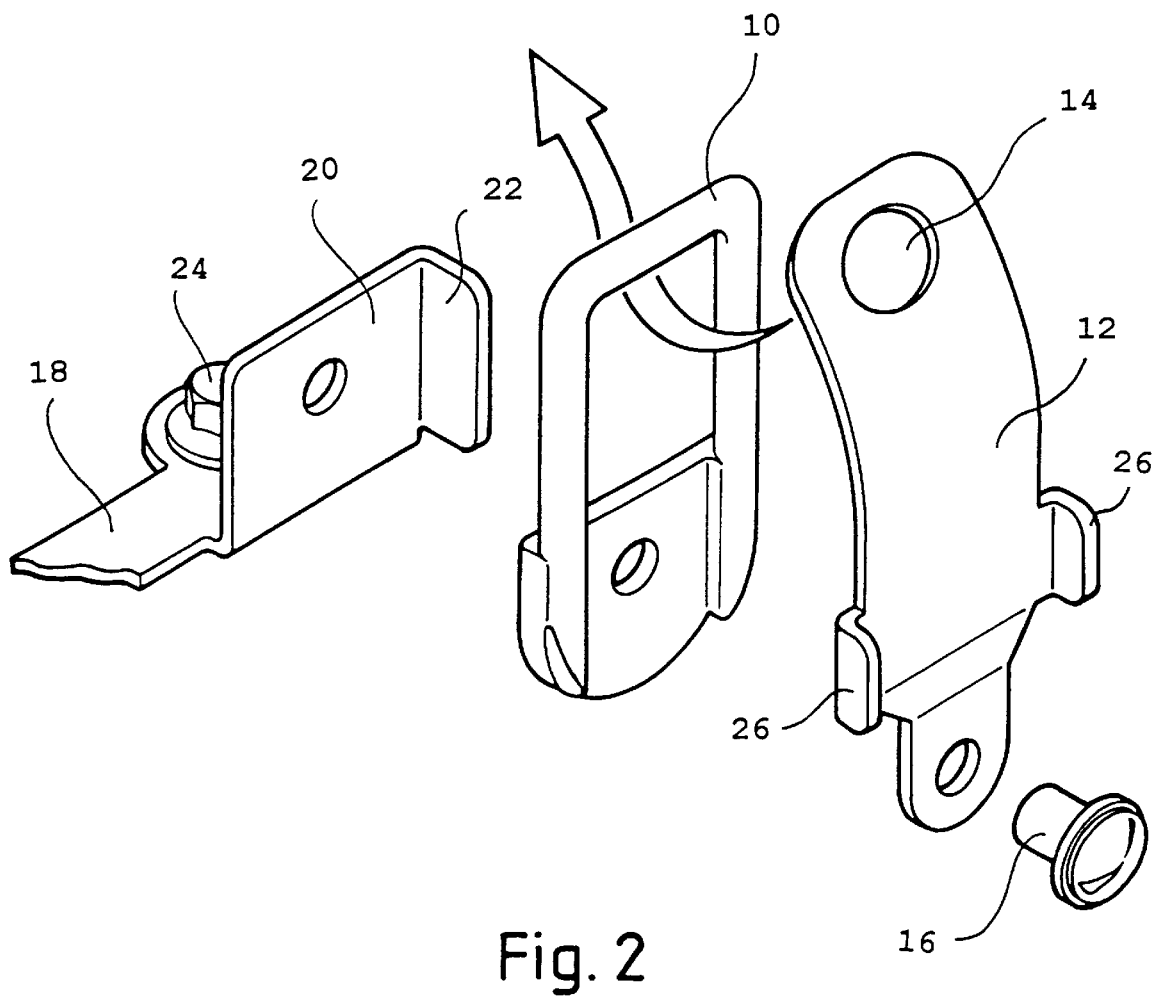
FIG. 2 is an exploded isometric view of part of a child seat anchoring device in accordance with the present invention.

As shown in detail in FIG. 2, the child seat anchorage device comprises the anchorage member 10, which is formed from a 6 mm diameter steel rod, a mounting bracket 20, and the guard plate 12. These components are assembled on a pivot pin 16, with the upper portion of the guard plate 12 being disposed through the loop of the anchorage member 10 as shown by the arrow. A pair of resilient tabs 26 on the guard plate 12 secure the guard plate about the anchorage member 10. The bracket 20 is secured to the floor of the vehicle, underneath the seat, by means of a bolt 24.

Figure 3:
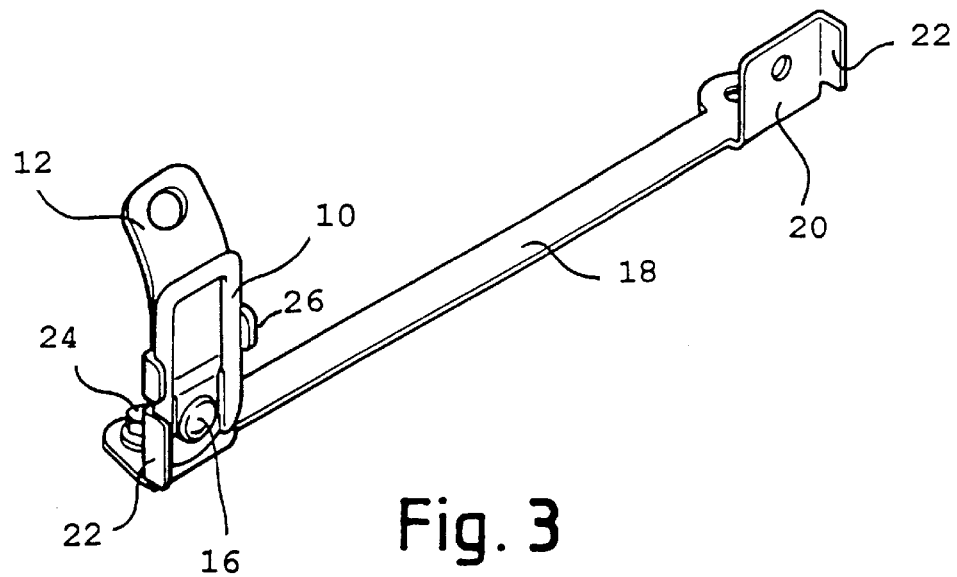
FIG. 3 is an isometric view of an assembly for anchoring a child seat, in accordance with the present invention.

As shown in FIG. 3, a pair of brackets 20 are connected together by means of a rigid metal tie bar 18. For the purpose of illustration, one device of the assembly is shown, the other device being a mirror image. Each anchorage member 10 can be pivoted away from the middle of the bar 18 to the use position shown in FIG. 4, and towards the middle of the bar 18 to the stowage position shown in broken lines in FIG. 4. In the stowage position the anchorage members 10 are downwardly disposed through the gap and hidden from view, behind the seat 4, thereby.

Figure 4:
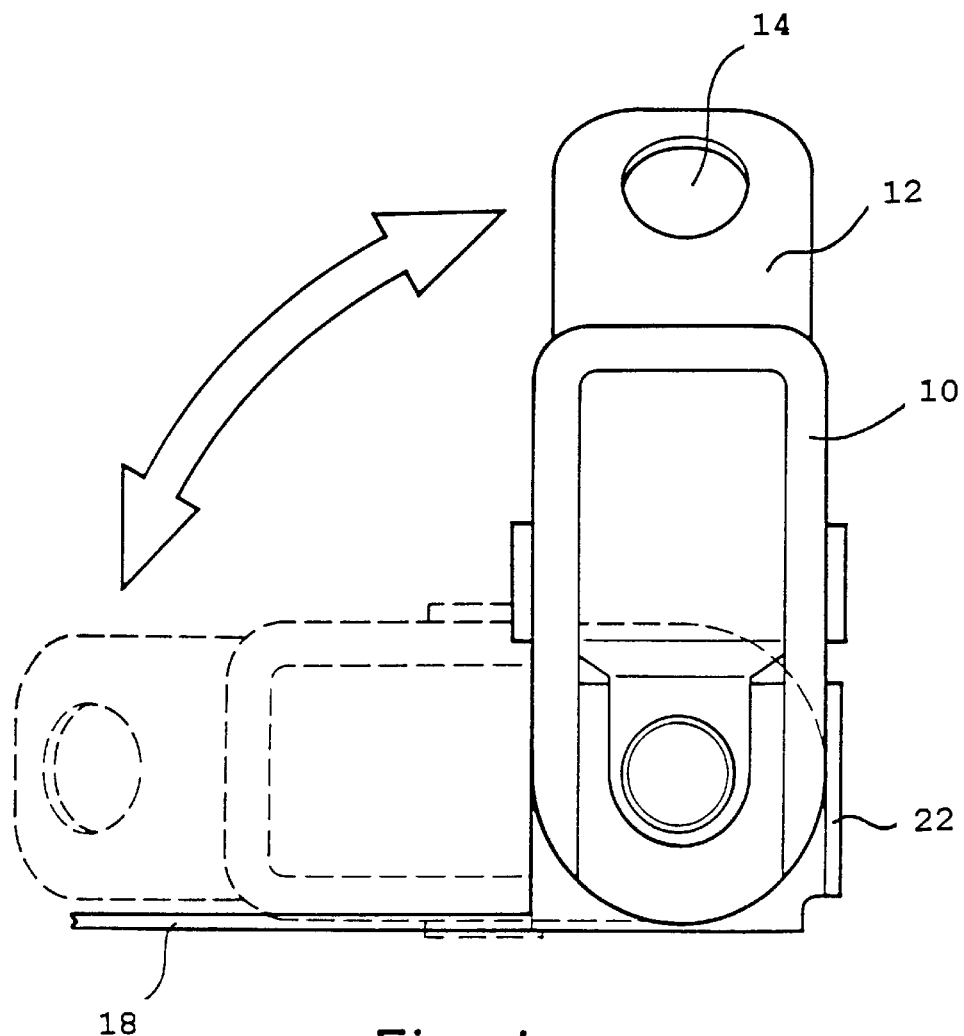
FIG. 4 is a side elevational view of the assembly shown in FIG. 3.

As shown in FIG. 4, an end stop 22 on the bracket 20 prevents pivoting of the anchorage member 10 beyond the use position, so that if the seat is subjected to a sideways load, one of the assemblies will resist pivotal movement under the load. The tendency to resist pivotal movement away from the use position may optionally be increased by the use of a detent mechanism between the anchorage member 10 and the bracket 20.

We claim:

1. A motor vehicle passenger seat comprising:

a seat;

a seat-back in contacting relationship with the seat;

a pair of laterally spaced anchorage members for anchoring a child seat disposed at the point of contact between the seat and seat-back; and the anchorage members being pivotally mounted in relation to the seat whereby the anchorage members can be pivoted between a use position in which they are upwardly disposed through a gap between the seat and the seat-back so that a child seat can be secured thereto, and a stowage position in which the anchorage members are downwardly disposed through the gap and hidden from view behind the seat thereby, the anchorage members being constrained to pivot in opposite directions to one another when pivoted between the use and stowage positions.

2. A motor vehicle passenger seat as claimed in claim 1, wherein at least one of the anchorage members is provided with a detent so that it resists being pivoted from the use position.

3. A motor vehicle passenger seat as claimed in claim 1, wherein the anchorage members are connected together as a child seat anchoring device by spacing means.

4. A motor vehicle passenger seat as claimed in claim 3, wherein the spacing means is substantially rigid.

5. A motor vehicle passenger seat as claimed in claim 1, wherein each anchorage member is provided with a guard plate which is disposed between the seat-back and the anchorage member when the anchorage member is in the use position.

6. A motor vehicle passenger seat as claimed in claim 4, wherein each guard plate is provided with a finger hole to facilitate lifting of the anchorage member from the stowage to the use position.

7. A motor vehicle passenger seat comprising:

a seat;

a seat-back in contacting relationship with the seat;

a pair of laterally spaced anchorage members for anchoring a child seat disposed at the point of contact between the seat and seat-back;

the anchorage members being pivotally mounted in relation to the seat whereby the anchorage members can be pivoted between a use position in which they are upwardly disposed through a gap between the seat and the seat-back so that a child seat can be secured thereto, and a stowage position in which the anchorage members are downwardly disposed through the gap and hidden from view behind the seat thereby, the anchorage members being constrained to pivot in opposite directions to one another when pivoted between the use and stowage positions; and a pair of guard plates each corresponding to an individual anchorage member, each guard plate disposed between the seat-back and the anchorage member when the anchorage member is in the use position.

8. A motor vehicle passenger seat as claimed in claim 7, wherein at least one of the anchorage members is provided with a detent so that it resists being pivoted from the use position.

9. A motor vehicle as claimed in claim 7, wherein the anchorage members are connected together as a child seat anchoring device by spacing means.

10. A device as claimed in claim 9, wherein the spacing means is substantially rigid.

11. A motor vehicle as claimed in claim 7, wherein each guard plate is provided with a finger hole to facilitate lifting of the anchorage member from the stowage to the use position.

* * * * *